United States Patent [19]

Nelson

[11] Patent Number: 4,625,942
[45] Date of Patent: Dec. 2, 1986

[54] VALVE ASSEMBLY, SEAT AND SEAL
[75] Inventor: Norman A. Nelson, Houston, Tex.
[73] Assignee: NL Industries, Inc., New York, N.Y.
[21] Appl. No.: 489,252
[22] Filed: Apr. 27, 1983

Related U.S. Application Data

[63] Continuation-in-part of Ser. No. 343,203, Jan. 27, 1982, Pat. No. 4,471,943.

[51] Int. Cl.⁴ ............................................. F16K 3/16
[52] U.S. Cl. .................................. 251/327; 251/174; 251/172; 251/328
[58] Field of Search ............... 251/172, 175, 328, 332, 251/327, 174

[56] References Cited

U.S. PATENT DOCUMENTS

| | | | |
|---|---|---|---|
| 3,068,887 | 12/1962 | Grove | 251/172 X |
| 3,078,865 | 2/1963 | Estes et al. | 251/172 X |
| 3,166,291 | 1/1965 | Grove | 251/172 |
| 3,272,472 | 9/1966 | Goldman | 251/172 |
| 3,307,826 | 3/1967 | Lowrey | 251/175 X |
| 3,347,261 | 10/1967 | Yancey | 251/328 X |
| 4,034,959 | 7/1977 | Morrison | 251/328 X |
| 4,192,483 | 3/1980 | Combes | 251/172 |
| 4,376,526 | 3/1983 | Freeman | 251/328 |
| 4,471,943 | 9/1984 | Nelson | 251/328 X |

FOREIGN PATENT DOCUMENTS

| | | | |
|---|---|---|---|
| 256115 | 9/1963 | Australia | 251/328 |
| 949442 | 2/1964 | United Kingdom . | |

Primary Examiner—Arnold Rosenthal
Attorney, Agent, or Firm—Browning, Bushman, Zamecki & Anderson

[57] ABSTRACT

A gate valve, seat, and face seal therefor, the valve including a valve body defining a longitudinal flowway and a valve element mounted in the valve body and movable transverse to the flowway between open and closed positions. The valve seat mounted in the valve body includes a seat body having an axially facing annular contact face for opposition to the valve element and an annular groove extending axially thereinto, the annular groove in turn having inner and outer side walls. The face seal comprises an annular elastomeric seal body having a base portion disposed in the annular groove and a sealing portion which, in a relaxed condition, projects axially outwardly from the annular groove. The seal body further has an annular auxiliary sealing formation extending about its outer diameter and sealing engaging the outer side wall of the annular groove.

20 Claims, 7 Drawing Figures

VALVE ASSEMBLY, SEAT AND SEAL

CROSS REFERENCE TO RELATED APPLICATION

This is a continuation-in-part of application Ser. No. 343,203 filed Jan. 27, 1982, now U.S. Pat. No. 4,471,943 dated Sept. 18, 1984.

BACKGROUND OF THE INVENTION

The present invention pertains especially to gate valves, more particularly through-conduit type gate valves, and seats therefor, although certain principles of the invention may also be applicable to other types of valves. A gate valve assembly typically includes a valve body defining a longitudinal flowway and a valve element mounted in the valve body and movable transverse to the flowway. In through-conduit gate valves, this valve element, or gate, has a solid portion of sufficient dimension to block off and close the flowway when it is aligned therewith. The gate also includes a bore or port oriented parallel to the flowway. By moving the gate in the aforementioned manner, the solid portion thereof can be displaced from alignment with the flowway, and the port moved into alignment with the flowway to open the valve. Such valves also typically include annular valve seats mounted in the valve body, coaxially with the flowway, on opposite sides of the gate, for sealing engagement with the latter.

In some types of gate valve assemblies, the valve seats are fixedly mounted in the valve body. The gate of such a valve assembly is formed in multiple parts which, when the valve is closed, are expanded longitudinally against the valve seats to form tight seals. In other valve assemblies, so called "floating seats" are employed. These seats are permitted limited axial play with respect to the valve body, and it is by virtue of such movement that they sealingly engage the gate. Floating seats are a virtual necessity for proper upstream sealing where the gate is of the "slab" or simple, straight-sided, one piece variety.

One of the advantages of through-conduit gate valve assemblies for oil field use, or other uses in which the fluid being handled may contain abrasive material, is that the gate periodically wipes the sealing faces of the seats as it is moved between its open and closed positions, and even when in the open position, remains in contact with the sealing areas of the seats, thereby protecting them. However, these types of valves also involve disadvantages, some of which are inversely related such that prior attempts to alleviate one of the problems would aggravate the other.

One such problem revolves around the force required to open the valve. This force is dependent on the sliding friction forces between the gate and seats. Even in those valve assemblies which are designed to seal only at the downstream seat, the operating force is a function of the outer diameter of the annular sealing area of the downstream seat. Where the valve also provides a secondary seal at the upstream seat, the operating force is further magnified. Logically, a reduction in the outer diameter of the seat's sealing area would correct this problem. However, too much reduction in this diameter will magnify a different problem revolving around the need for adequate bearing area. Since the sealing area and bearing area of the conventional valve seat are coextensive, a reduction in the sealing area also reduces the bearing area. This is particularly undesirable in high-pressure valves, especially since the applicable industry standards require the use of relatively soft metals. It can be seen that, particularly with such relatively soft metals, if a high-pressure force is distributed over only a very small bearing area, galling and material failure can occur.

A third common problem with these types of valve assemblies is related to the fact that the valve body defines cavities adjacent the flowway for receipt of the gate. During normal operation with the valve open, pressurized fluid may enter these cavities. In any event, when the valve is moved to its closed position, this pressurized fluid will enter the cavities and may become trapped in the valve body. More particularly, this trapping occurs in assemblies with floating seats where the diameter of the seal between the seat and valve body is less than the diameter of the sealing area of the seat against the gate. With this relationship in diameters, the pressure already within the cavities in the valve body will urge the seats into even tighter engagement with the gate, which increases the force necessary to reopen the valve. In the meantime, with the valve still closed, the trapped fluid within the valve body makes it susceptible to explosion, representing an extremely dangerous situation.

Still another problem is associated with those types of floating seat gate valves in which the seats, in addition to defining a metal-to-metal seal area, also carry an elastomeric face seal for sealing against the gate or valve element. When the valve is closed, pressure trapped within the valve body will tend to urge these face seals into tight sealing engagement with the gate. As the gate is opened, the elastomeric face seal tends to be drawn outwardly from the groove in the valve seat in which it is carried so that it projects well into the port in the gate as that port comes into alignment with the seal. As the port then continues to move into full coaxial alignment with the flowway of the valve body, the trailing edge of the port shears off the projecting portion of the elastomeric seal. This problem is particularly pronounced with respect to the face seal of the upstream seat, and at least two factors are believed to contribute to the problem of undue protrusion of the seal from its groove as the gate is opened. The first of these is the fact that the seal, having established sealing contact with the gate, will tend to maintain the seal against the solid portion of the gate and thus "follow" the solid portion as the gate port moves past the seal. Also, pressure within the valve body enters the groove in which the face seal is mounted and tends to force the seal out of that groove. The reason the problem is especially pronounced at the upstream seal is that there may be a clearance between the upstream seal and the gate into which the elastomeric seal can flow under the influence of such factors.

SUMMARY OF THE INVENTION

In accord with one aspect of the present invention, the generally axially facing annular contact face of the valve seat, which face engages the gate in use, is provided with an annular groove therein intermediate its radially inner and outer extremities. The seat also has vent means communicating with this annular groove and extending outwardly therefrom through the radially outer periphery of said seat body. This reduces the outer diameter of the sealing area of the contact face without substantially reducing the bearing area. Furthermore, if the inner diameter of the aforementioned groove is less than the effective sealing surface diameter between the valve seat and valve body, any pressurized fluid within the gate cavities of the valve body when the valve is closed will tend to urge the seat away from, rather than toward, the gate, so that the fluid will not become trapped in the valve body.

In preferred embodiments of the invention, the main body of the seat itself comprises a sleeve-like portion for mounting on the valve body and a flange extending radially outwardly from one end of the sleeve-like portion, the aforementioned contact face being defined by said one end of the sleeve-like portion and the adjacent side of the flange. The vent means mentioned above is preferably defined by a plurality of vent grooves formed in the contact face. In any event, the portion of the contact face intermediate the annular groove and the radially inner extremity of the contact face defines a metal-to-metal seal area which, as mentioned above, is substantially less than the bearing area of the contact face.

In accord with another aspect of the present invention, an improved form of elastomeric face seal is provided. In preferred embodiments, this improved face seal is mounted in the aforementioned annular groove in the contact face of the seat, with the vent grooves communicating with the annular groove radially outwardly of the elastomeric body of the face seal. However, the improved face seal according to the present invention may also be advantageously utilized in more conventional seats which do not include the venting system according to the present invention.

In any event, the improved face seal according to the invention comprises an annular elastomeric seal body having a base portion, which in use, is disposed in an annular groove in the axial contact face of the valve seat, and a sealing portion which, in a relaxed condition, projects slightly axially outwardly from said annular groove. The seal body further has an annular auxiliary sealing formation extending about its outer diameter and sealingly engaging the radially outer side wall of the annular groove. In those embodiments including a venting system as described hereinabove, a common annular groove is used to define the outer diameter of the metal sealing area on the valve seat and also to mount the elastomeric seal body, and the vent grooves or other vent means communicate with this annular groove radially outwardly of the seal body and axially inwardly of the aforementioned auxiliary sealing formation.

The auxiliary sealing formation is preferably disposed on the base portion of the seal body and comprises a lip which, in a relaxed condition, flares radially outwardly and axially inwardly for sealing against flow of fluid into the annular groove along the radially outer side wall thereof. Thus, fluid within the valve body not only will not be permitted to flow behind the seal and force it out of its groove, but on the contrary, will be caught in the cup or crevice defined by the flared lip and actually help to hold the seal body in a bottomed-out position within its annular groove.

The base portion of the seal body is preferably thicker in radial extent than the sealing portion, with the latter being spaced radially inwardly from the outer diameter of the base portion. Thereby an annular void or space is formed between the radially outer side wall of the annular groove and the sealing portion of the seal body. This space not only allows flexure of the sealing portion of the seal body, but also provides a convenient site for communication of the vent grooves, in those embodiments in which vent grooves are employed.

A stiffening means may advantageously be associated with the base portion of the seal body to further ensure against the possibility of the seal body protruding outwardly from its annular groove at some point about its circumference.

It is a principal object of the present invention to provide an improved valve seat.

It is another object of the invention to provide an improved gate valve assembly having at least one floating-type seat.

Still another object of the present invention is to provide such a valve assembly and/or seat having an elastomeric face seal including an auxiliary sealing formation engaging the radially outer side wall of its annular mounting groove and sealing against flow of fluid into that groove.

Still another object of the present invention is to provide such a valve assembly and/or seat in which the seat further has vent means communicating with the annular groove and extending outwardly through the seat body.

A further object of the present invention is to provide an improved face seal for a valve seat.

Still other objects, features, and advantages of the present invention will be made apparent by the following detailed description, the drawings, and the claims.

DETAILED DESCRIPTION

Figure 1:
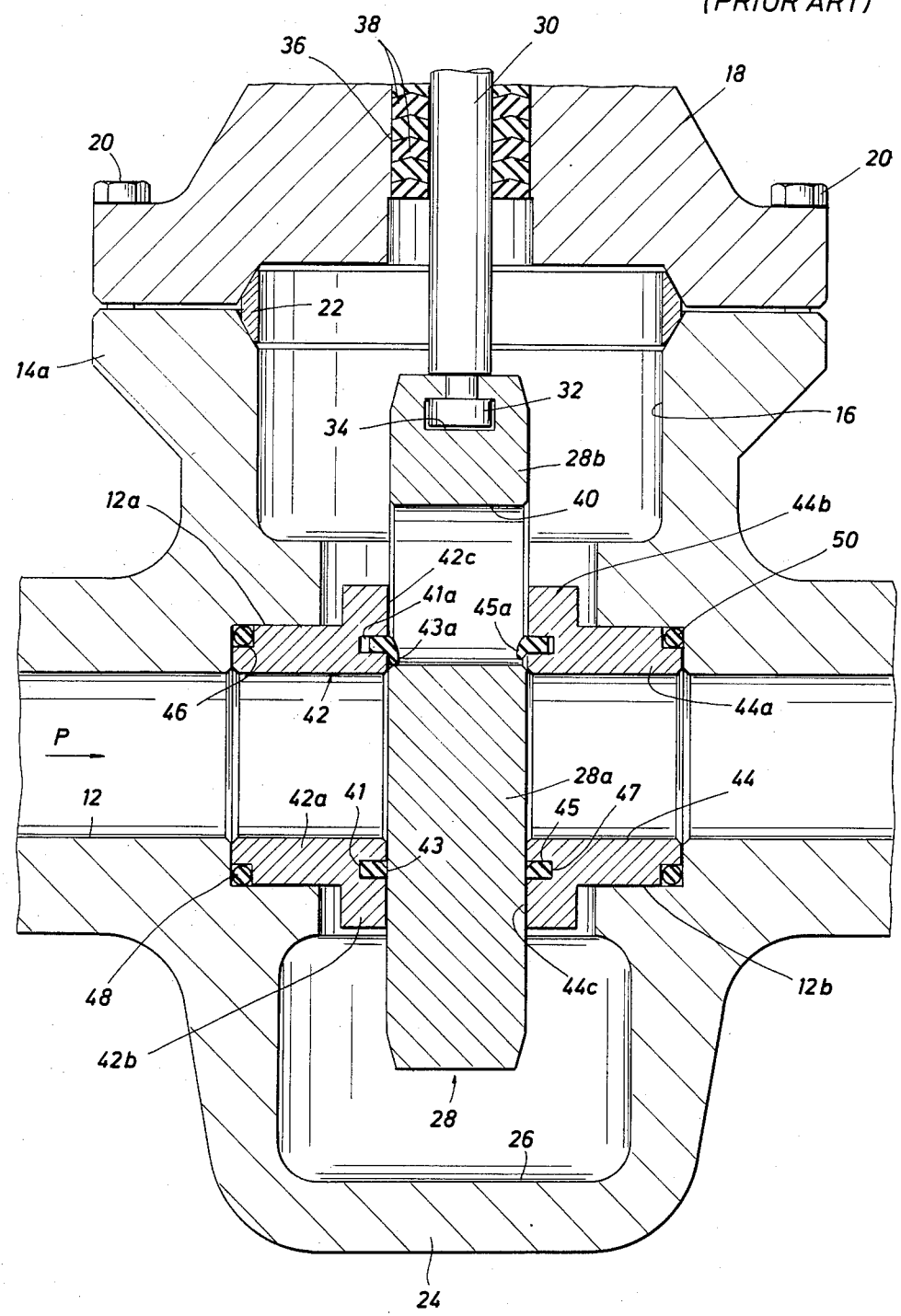
FIG. 1 is a longitudinal sectional view through a prior art gate valve assembly.

FIG. 1 illustrates what will, for simplicity, be referred to as a "prior art" gate valve assembly. Although FIG. 1 does not necessarily accurately illustrate any one known item of prior art, it generally typifies the prior art in that it is illustrative of the principles and problems involved. The assembly of FIG. 1 includes a valve body 10 which has an elongate flowway 12 therethrough. As used herein, terms such as "longitudinal," "circumferential," and "radial" will be used with reference to the flowway 12 and the corresponding bores of the valve seats, unless otherwise noted. Also, terms such as "upwardly" and "downwardly" will refer to the apparatus as it is shown in the drawings, although it should be understood that the apparatus might be disposed in other positions in actual use, so that these latter terms should not be construed in a limiting sense. The side portions of valve body 10 adjacent the opposite ends of flowway 12 (not shown) are adapted for connection into a flow conductor such as a pipeline or other conduit. Valve body 10 has a hollow extension 14 extending upwardly away from flowway 12. Projection 14 defines a cavity 16 which intersects flowway 12. A bonnet 18 is connected to a flange 14a at the upper end of projection 14 by bolts 20, so that bonnet 18 completes and generally closes cavity 16. A metal seal 22 is provided at the interface of projection 14 and bonnet 18 and at their inner diameters. A closed projectin 24 extends downwardly generally opposite projection 14 and defines a cavity 26 intersecting flowway 12.

A valve element in the form of a slab-type gate 28 is mounted in valve body 10. Gate 28 lies transverse to flowway 12, and is also movable within body 10 in a direction transverse to flowway 12, more particularly in a vertical directional mode as shown in the drawing. A valve stem 30 is secured to the upper end of gate 28 by mating key formation 32 on the lower end of valve stem 30 and slot 34 in the upper end of gate 28. Stem 30 extends upwardly through a vertical bore 36 which serves as a stuffing box in bonnet 18, and is sealed with respect thereto by packings 38. The upper end (not shown) of valve stem 30 is attached to a suitable actuator by which the valve stem 30 and attached gate 28 may be moved upwardly and downwardly.

The lower portion of gate 28 is solid as shown at 28a so that, when gate 28 is in its uppermost position, solid portion 28a lies transversely across flowway 12 to close the valve. In this position, cavity 16 provides a space for receipt of the upper portion 28b of gate 28. Said upper portion 28b has a port or bore 40 extending therethrough parallel to flowway 12. When gate 28 is moved downwardly, port 40 is brought into alignment with flowway 12 to open the valve. Cavity 26 provides a space for receipt of lower portion 28a of gate 28 to allow such movement. FIG. 1 shows gate 28 in process of moving from closed to open position.

Flowway 12 is counterbored, as indicated at 12a and 12b, at its points of intersection with cavities 16 and 26. Annular valve seats comprising seat bodies 42 and 44 are mounted in valve body 10 on opposite sides of gate 28. The upstream seat body 42 comprises a sleeve-like, and more specifically generally cylindrical, portion 42a and an annular flange 42b extending radially outwardly from one end of portion 42a. The opposite end of portion 42a is mounted in counterbore 12a. The axially innermost side of flange 42b and the contiguous end surface of sleeve-like portion 42a of seat body 42 define an annular contact face 42c for engagement with gate 28. Except for a small bevel at the inner diameter, contact face 42c covers the full radial extent of the seat body. Face 42c is planar, for sliding engagement with the planar side of gate 28, and defines not only the bearing area of seat body 42 against gate 28, but also a metal-to-metal sealing area.

Contact face 42c has an annular mounting groove 41 extending axially thereinto, and carried in groove 41 is an elastomeric face seal 43. Seal 43 supplements the metal-to-metal seal provided by contact face 42c by providing an additional soft or elastomeric seal. However, the fact that seal 43 is located intermediate the inner and outer extremities of contact face 42c does not interfere with the metal-to-metal sealing effect both inwardly and outwardly thereof.

The sleeve-like portion 42a of seat body 42 has an external annular groove 46 at the end opposite flange 42b. An O-ring 48 is carried in groove 46 so that its outer diameter forms an annular body sealing surface for sealing engagement with counterbore 12a of valve body 10. Because O-ring 48 is exposed along the axial end of seat body 42, and further because it is compressed against the shoulder between flowway 12 and counterbore 12a when the valve is assembled, it will act as a spring resiliently biasing seat body 42 toward gate 28, while permitting limited axial play or floating action of the seat body.

The downstream valve seat is a mirror image of the upstream valve seat, and thus, will not be described in detail. Briefly, its seat body 44 includes a cylindrical sleeve-like portion 44a, a radial flange 44b, a contact face 44c, and an O-ring 50, similar to parts 42a, 42b, 42c, and 48 respectively of the upstream seat. The O-ring 50 both seals and resiliently biases the seat with respect to the valve body. An elastomeric face seal 45 is carried in an annular groove 47 in face 44c.

When the valve is in its closed position, pressure upstream acts in the direction of arrow P to urge gate 28 against contact face 44c of the downstream valve seat with a force proportional to pressure. This increases the frictional forces between the gate and downstream seat, which in turn increases the force necessary to open the valve. It can be shown that the latter force is also a direct function of the outer diameter of the contact face 44c, which is a metal-to-metal sealing surface engaging gate 28. Since, in the embodiment shown an upstream seal is also provided, by virtue of floating seat body 42, the force necessary to open the valve is even further increased. However, a reduction in the outer diameter of contact face 44c, in an effort to decrease the sealing area, and thus, the operating force, would also decrease the bearing area of seat body 44 available for contact with gate 28. This is particularly undesirable in a high-pressure situation, wherein a large force is distributed over only a small area, particularly since industry standards require relatively soft metals in such valves. The result can be galling and/or material failure.

Prior art valves such as are shown in FIG. 1 also involve a problem of trapping of fluid pressure within the valve body. For example, assume that a second valve assembly (not shown) is disposed downstream of the assembly of FIG. 1, and that both valves are open and the fluid in the line is under pressure. Further assume that the downstream valve is closed first, followed by closing of the valve of FIG. 1. If the line pressure is then reduced, both upstream and downstream, pressurized fluid will be trapped in cavities 16 and 26. This pressurized fluid would be prevented from leaking out past the valve seats in the case of the upstream seat for example, by the seals which are formed at face 42c and the O-ring seal 48. The annular area between the outer diameter of sealing area 42c and the inner diameter of O-ring 48 on the upstream seat serves an an annular piston on which the trapped fluid can act. Because the inner diameter of the axially outermost seal 48 is less than the outer diameter of axially inner sealing area 42c, the trapped pressure will serve to urge the seat body 42 even more tightly against gate 28, thereby trapping the fluid in cavities 16 and 26. This not only increases the force necessary to reopen the valve, but presents a dangerous situation.

The above problems are associated with prior art valves as shown, as well as valves in which face seals 43 and 45 are not employed, i.e. in valves in which a sealing area—whether all metal-to-metal or part metal-to-metal and part elastomeric-extends across virtually the entire radial extent of the contact face of the floating seat body.

In those valves in which the seat bodies carry face seals as shown, an additional problem is encountered. As the gate 28 is moved from its closed position to its open position, the upper portion of upstream face seal 43 begins to protrude axially inwardly into port 40 as the latter comes into alignment with said upper portion of the seal as shown at 43a. It can be seen that the base of the upper portion of seal 43 has moved out of engagement with the bottom of groove 41, leaving a space as shown at 41a. As gate 28 continues to move downwardly into its open position, the trailing or upper edge of port 40 will shear off the portion 43a of the seal now protruding well out into port 40. The same problem may be experienced, although to a lesser extent, with downstream seal 45 as shown at 45a.

This phenomenon is believed to be caused by at least two factors. Firstly, as gate 28 moves downwardly, seal 43 tends to maintain the seal it has established with the gate, and thus, after the lower or leading edge of port 40 has passed the upper part 43a of seal 43, that part of the seal will tend to "follow" the gate downwardly. Secondly, fluid trapped within the valve body, and particularly in cavity 16, can flow into the bottom of groove 41 and then act to urge seal 43 outwardly therefrom. It is further believed that the reason this problem is more acute in the case of the upstream seal is that, when the gate 28 is closed, and the upstream side is pressurized, the gate 28 is urged more tightly against the downstream seal 45, whereas at the upstream face seal 43, there is not such a tight engagement, and in fact there may be a clearance between contact face 42c and gate 28, allowing leeway for seal 43 to flow outwardly from its groove.

Figure 2:
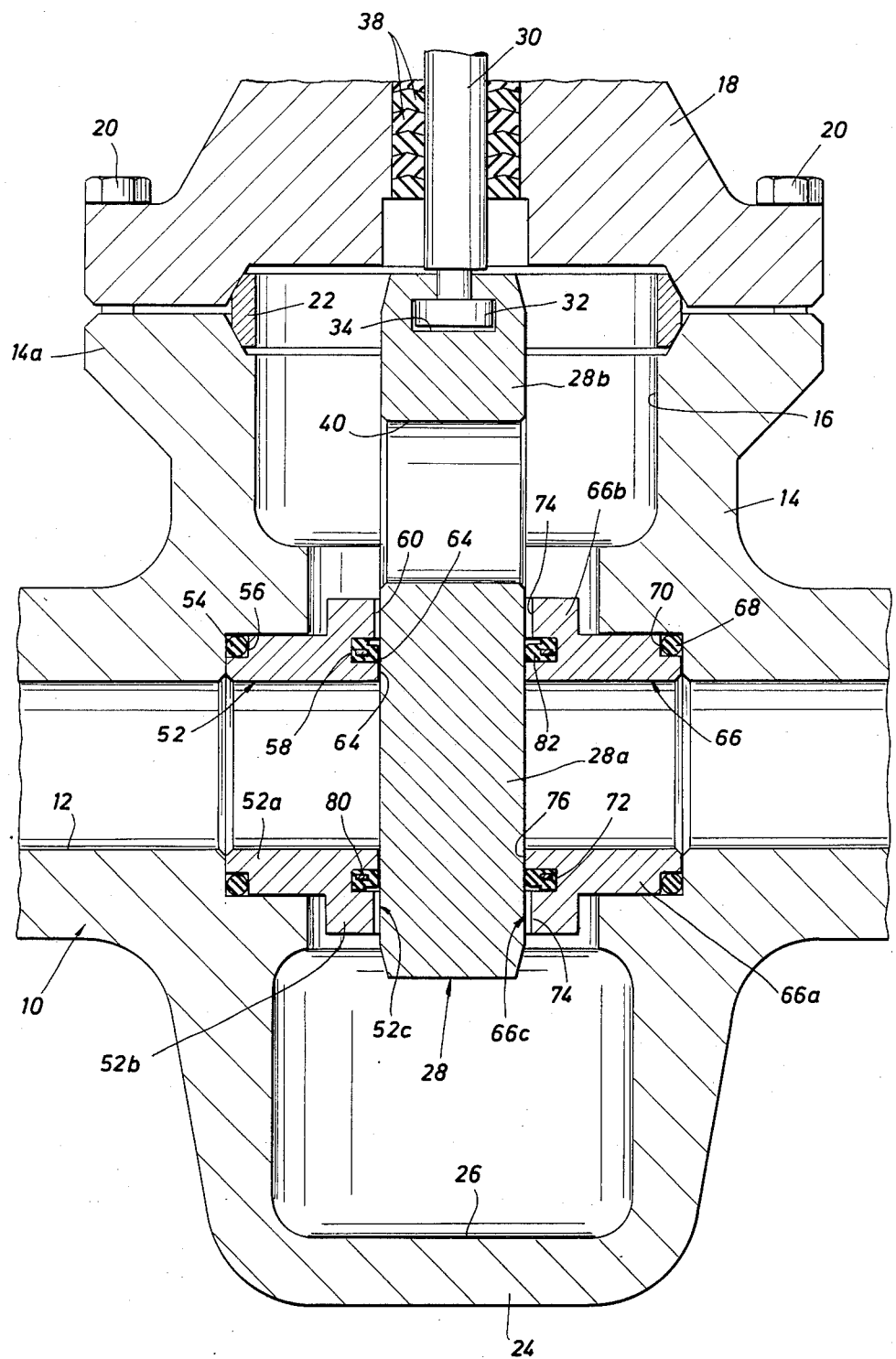
FIG. 2 is a view similar to that of FIG. 1 showing the present invention.

Turning now to FIG. 2, there is shown a gate valve assembly in accord with a first embodiment of the present invention. All parts of the assembly except for the valve seats are virtually identical to the corresponding parts of the valve assembly of FIG. 1. Accordingly, like parts in FIGS. 1 and 2 have been given like reference numerals, and these parts, e.g. the valve body 10, bonnet 18, and gate 28, will not be again described in detail in connection with FIG. 2.

The upstream valve seat of the embodiment of FIG. 2 is similar to the upstream valve seat of the prior art in that it comprises a seat body 52 and an O-ring type body seal 54, the seat body 52 including a sleeve-like portion 52a and a flange 52b extending radially outwardly from one end of the sleeve-like portion 52a. The O-ring 54 is likewise carried in an external annular groove 56 at the opposite end of sleeve-like portion 52a from flange 52b.

Figure 4:
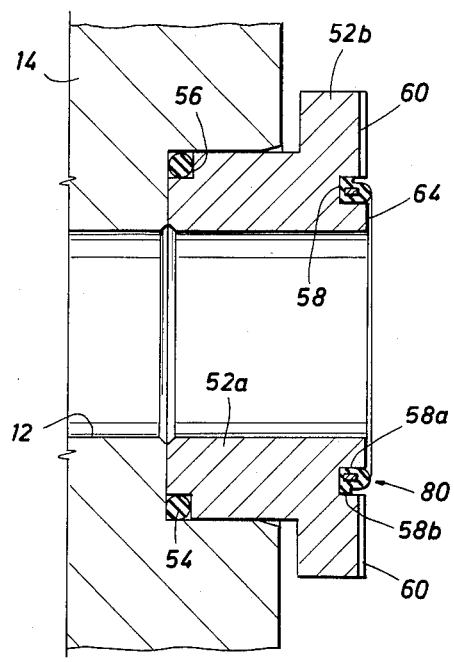
FIG. 4 is an enlarged longitudinal sectional view through a modified form of valve seat.
Figure 3:
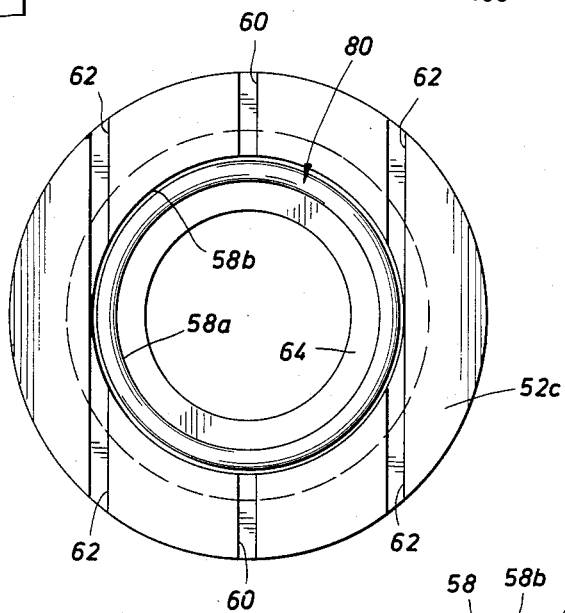
FIG. 3 is an enlarged end view of the contact face of the valve seat taken along the line 3—3 in FIG. 2.

Referring now also to FIGS. 3 and 4, contact face 52c, defined by the righthand end of sleeve-like portion 52a and the contiguous side of flange 52b, has an annular groove 58 intermediate its radially inner and outer extremities. Groove 58 has cylindrical inner side wall 58a and cylindrical outer side wall 58b sized to receive an improved seal 80. Also machined in face 52c are a plurality of parallel vent grooves 60 and 62. Vent grooves 60 are oriented radially with respect to groove 58, while vent grooves 62 are oriented tangentially to groove 58. All of the grooves 60 and 62 intersect or communicate with groove 58 at its outer diameter 58b and extend outwardly therefrom across face 52c. For a purpose to be described more fully below, the machining of grooves 58, 60, and 62 leaves a substantially uninterrupted annular sealing area 64 intermediate groove 58 and the radially inner extremity of face 52c.

The downstream seat is a mirror image of the upstream seat, comprising a seat body 66 with sleeve-like portion 66a and flange 66b, a body O-ring seal 68 being carried in an external annular groove 70 in the end of sleeve-like portion 66a which is mounted in the valve body. Like face 52c of the upstream seat body, the annular contact face 66c of the downstream seat body has machined therein an annular groove 72, mounting face seal 82, and a plurality of vent grooves, two of which are shown at 74.

Referring still to FIGS. 2 and 3, it can be seen that, due to the venting system comprised of annular groove 58 and vent grooves 60 and 62, only the uninterrupted annular area 64 defined between the inner diameter of groove 58 at wall 58a and the inner diameter of face 52c as a whole will form an effectively pressure tight seal against the upstream side of gate 28. Seal 80 performs a somewhat different type of sealing function by conforming to any scratches or other imperfections which might be present on the surface of gate 28 and thereby preventing actual fluid flow. However, under high pressures, the elastomeric material of the body of seal 80 behaves like a part of the overall fluid body in the valve. Thus, pressure can be transmitted through or across seal 80, and accordingly, the effective sealing area of contact face 52c, in terms of pressure or force transmission, includes only the metal sealing area 64 contiguous the inner diameter of seal 80. An uninterrupted annular seal area 76 is likewise formed between groove 72 of the downstream seat body 66 and the inner diameter of that body, and area 76 is the only portion of contact face 66c which forms an effectively pressure tight seal against the downstream side of gate 28.

Because the inner diameters of the grooves 58 and 72 are substantially less than the outer diameters of the corresponding contact faces 52c and 66c, these annular sealing areas are much smaller than, for example, those of the prior art seats of FIG. 1, even though those seats have similar overall inner and outer contact face diameters. This reduction in the sealing area, particularly on the downstream seat body 66, substantially reduces the pressure force and resultant operating force needed to open the valve. However, the reduction in bearing area is negligible. More specifically, the entire surface area of contact faces 52c and 66c, exclusive of the grooves 58, 60, 62, 72, and 74, is available for distribution of the bearing load against gate 28.

Another salient feature of the valve seats of FIGS. 2-4 is that they eliminate the problem of trapping of pressurized fluid within the valve body cavities 16 and 26. As mentioned, the effective area of sealing engagement between the gate 28 and each of the seat contact faces 52c and 66c extends only from the inner diameter of the contact face to the inner diameter of its respective annular groove 58 or 72. The latter diameter is less than the inner diameter of the O-ring 54 or 68 which defines the effective sealing diameter, for sealing engagement between the respective valve seat and the valve body, with respect to fluid pressure acting radially inwardly. Therefore, pressurized fluid trapped in the valve body will tend to urge the floating seats away from the gate 28, so that the fluid can flow out of the cavitites 16 and 26, relieving the pressure therein, past one or the other of the seat bodies.

Figure 5:
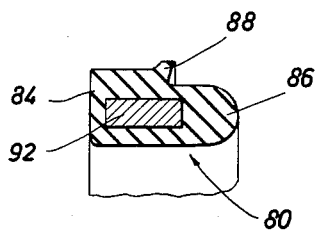
FIG. 5 is an even further enlarged longitudinal sectional view through the face seal in a relaxed condition prior to insertion into its mounting groove.

Referring to FIG. 5, seal 80 is shown in greater detail. In particular, seal 80 comprises an annular elastomeric body which, as best seen in longitudinal cross section, includes a base portion 84 adjacent one axial end and sized for an interference fit within groove 58. At the opposite or axially inner end is a sealing portion 86 of the annular elastomeric seal body. Base portion 84 is thicker in radial extent than sealing portion 86, and sealing portion 86 is spaced radially inwardly from the outer diameter of base portion 84, the inner diameters of portions 84 and 86 being generally continuous with each other.

The annular elastomeric seal body also includes an annular auxiliary sealing formation extending about its outer diameter. In the embodiment shown, this auxiliary sealing formation is in the form of a lip 88 formed on base portion 84 near its juncture with sealing portion 86. As shown in FIG. 5, lip 88, in a relaxed condition, flares radially outwardly and axially inwardly, i.e. axially toward sealing portion 86. Thus, when seal 80 is installed in groove 58 as shown in FIG. 6, lip 88 sealingly engages the outer side wall 58b of groove 58 in such a manner as to seal against flow of fluid into that groove along said outer wall thereof.

Figure 6:
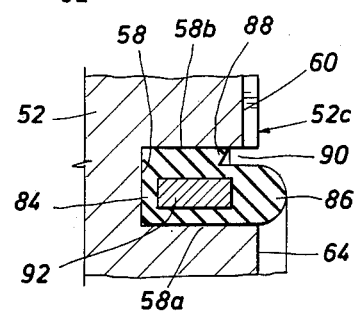
FIG. 6 is a view similar to that of FIG. 5 showing the seal installed in the mounting groove.

FIG. 6 shows the seal installed in groove 58, but not sealingly engaging valve gate 28. Thus, sealing portion 86 is in its "relaxed" condition wherein it protrudes slightly axially inwardly beyond contact face 52c. The spacing of sealing portion 86 radially inwardly from the outer diameter of base portion 84 provides a space 90 permitting flexure of sealing portion 86 so that it may engage gate 28 for the aforementioned purpose without inhibiting full metal-to-metal sealing engagement of area 64 with gate 28. As previously mentioned, sealing portion 86, while providing a fluid-tight seal against gate 28, behaves like a fluid under pressure in the sense that pressure can be transmitted across the elastomeric seal body. Thus, the presence of the elastomeric seal body within groove 58 does not interfere with the pressure "venting" effect of grooves 58, 60 and 62, as described above provided that the vent grooves intersect groove 58 radially outwardly of seal 80 and axially inwardly of lip 88.

As mentioned, lip 88 prevents fluid within the valve body from flowing into groove 58 along the outer side wall 58b thereof. This not only prevents fluid from flowing into the bottom of groove 58 and tending to push seal 80 out of the groove, as described in connection with FIG. 1, but actually utilizes such fluid (tending to flow into groove 58) to help retain seal 80 in a full bottomed-out position within groove 58. More specifically, the crevice formed between lip 88 and sealing portion 86 will serve as a sort of pocket thus trapping and effectively utilizing such pressurized fluid to retain the seal as described.

To further ensure against the possibility of the seal body bulging out of its mounting groove 58 at any one point about its circumference, a stiffening means is associated with base portion 84. In the embodiment shown, the stiffening means is provided in the form of a metal ring 92 embedded substantially within base portion 84. However, the stiffening means could be comprised of other types of materials and could, for example, be embedded in base portion 84 or bonded or mechanically interlocked to the exterior of base portion 84.

Seal 82 of downstream seat 66 is a mirror image of seal 80, and thus will not be further described in detail.

Figure 7:
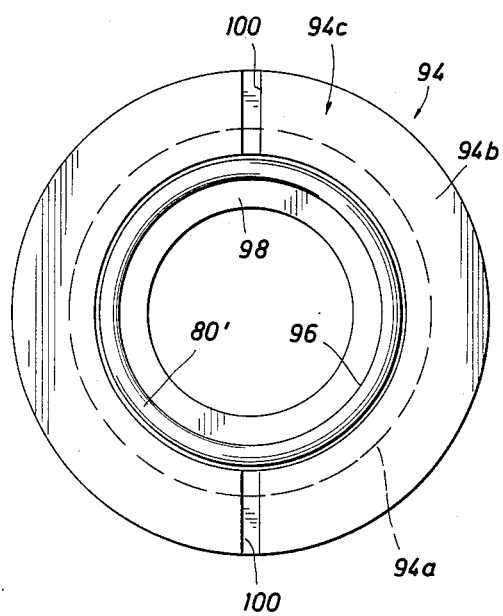
FIG. 7 is a view similar to that of FIG. 3 showing an alternative embodiment of the valve seat.

Referring now to FIG. 7, there is shown a second embodiment of valve seat according to the present invention. Once again, the seat comprises a seat body 94 having a sleeve-like portion 94a with a flange 94b extending radially outwardly from one end of the sleeve-like portion 94a. That end of sleeve-like portion 94a and the contiguous side of flange 94b define an annular contact face 94c for engagement with a valve gate. The other end of sleeve-like portion 94a would be mounted in a counterbore of the flowway of a valve body and have an external annular groove to carry an O-ring for sealing against the valve body and resiliently biasing the seat body 94 toward the valve gate.

As in the first embodiment, an annular groove 96 has been formed in contact face 94c intermediate its radially inner and outer extremities and groove 96 mounts a seal 80' identical to seal 80 of the first embodiment. The uninterrupted annular metal surface 98 disposed between groove 96 and the inner diameter of face 94c provides a metal-to-metal seal. A pair of vent grooves 100 are also machined into face 94c intersecting groove 96 and extending radially outwardly therefrom through the outer periphery of the seat body 94. The grooves 96 and 100 serve, as in the preceding embodiment, to reduce the effective metal-to-metal sealing area against the valve gate, without substantially reducing the bearing area of the contact face 94c, thereby reducing the operating force and preventing the trapping of pressurized fluid within the valve body.

The foregoing represent only two preferred embodiments of the present invention, and numerous other modifications may suggest themselves to those of skill in the art. For example, in each of the embodiments shown, the annular sealing area on the valve seat for sealing engagement with the valve body is defined by an O-ring carried by the valve seat body. However, the body seal could be an O-ring carried in an internal groove in the valve body. In any event, such a seal could be disposed anywhere along the length of the seat body, and if not located at the axially outer end thereof, other resilient biasing means for the floating seat body could be provided. In other modifications, the seat may not be mounted in a counterbore or pocket in the valve body.

Although a particularly effective valve seat or valve assembly may be provided by using the improved seal of the invention in conjunction with venting grooves such as 60 and 62, the improved seal according to the invention can also be advantageously used in more conventional valve seats not including vent means for effectively reducing the metal-to-metal sealing area.

Other modifications might involve changes in the configuration of the seat body itself. For example, the number, size, and arrangement of any vent grooves on the contact face could be varied. However, it is not even necessary that the vent means which communicate with the annular groove in the contact face be in the form of other grooves machined in that same contact face. The vent means could be comprised of one or more internal bores extending through the seat body, it only being necessary that the vent means communicate with the annular groove (radially outwardly of the face seal and axially inwardly of its auxiliary sealing lip) and extend through the outer periphery of the seat body (either through the flange or through the sleeve-like portion) axially inwardly of the seal between the seat body and the valve body. Also, in the embodiments shown, the radially inner metal-to-metal sealing area on the gate contact face of the seat is substantially uninterrupted and extends to the inner diameter of the seat. However, it is only necessary that an annular area capable of metal-to-metal sealing be provided somewhere between the annular groove and the seat I.D. Thus, for example, the contact face may be provided with additional unvented annular grooves located radially inwardly of the vented groove, or the I.D. of the contact face might be bevelled.

Still other modifications are encompassed within the spirit of the invention. Accordingly, it is intended that the scope of the invention be limited only by the claims which follow.

What is claimed is:

1. An annular seat for a valve assembly comprising:
   a seat body having a generally axially facing annular contact face for opposition to a valve element and having an annular groove located between the radially inner and outer extremities of said contact face and extending axially thereinto, said annular groove having inner and outer side walls, said contact face having an annular sealing area intermediate said annular groove and the inner extremity of said contact face; and
   a face seal comprising an annular elastomeric seal body having a base portion disposed in said annular groove and a sealing portion which in a relaxed condition projects axially outwardly from said annular groove, said seal body further having an annular auxiliary sealing formation extending about its outer diameter, said auxiliary sealing formation in a relaxed condition projecting radially outwardly from said base portion, and when said base portion is installed in said annular groove, being resiliently deflected radially inwardly by said outer side wall to sealingly engage said outer side wall; and
   vent means located in said seat body for communicating with said annular groove radially outwardly of said seal body and axially inwardly of said auxiliary sealing formation, said vent means extending outwardly from said annular groove through the radially outer periphery of said seat body.

2. A seat according to claim 1 wherein said auxiliary sealing formation is disposed on said portion of said seal body.

3. A seal according to claim 2 wherein said auxiliary sealing formation comprises a lip which, in a relaxed condition, is generally inclined radially outwardly and axially inwardly for sealing against flow of fluid into said annular groove along said outer side wall.

4. A seat according to claim 3 wherein said base portion of said seal body is thicker in radial extent than said sealing portion.

5. A seat according to claim 4 wherein said sealing portion of said seal body is disposed partially in said annular groove and spaced radially inwardly from said outer side wall whereby a space is formed within said annular groove between said outer side wall and said sealing portion of said seal body to permit flexure of said sealing portion.

6. A seat according to claim 5 wherein said base portion of said seal body is sized to fit snugly between said inner and outer side walls of said annular groove whereby said auxiliary sealing formation is deflected radially inwardly by said outer side wall.

7. A seat according to claim 6 wherein said inner and outer side walls of said annular groove are generally cylindrical, and wherein the inner diameter of said sealing portion of said seal body is continuous with the inner diameter of said base portion and parallel to said inner side wall.

8. A seat according to claim 7 wherein said face seal further comprises stiffening means associated with said base portion of said seal body.

9. A seat according to claim 8 wherein said stiffening means comprises an annular stiffening body embedded in said base portion of said seal body.

10. A seat according to claim 3 wherein said base portion of said seal body is sized to fit snugly between said inner and outer side walls of said annular groove whereby said auxiliary sealing formation is deflected radially inwardly by said outer side wall.

11. A seat according to claim 3 wherein said face seal further comprises stiffening means associated with said base portion of said seal body.

12. A seat according to claim 1 comprising means defining an annular body seal on the outer periphery of said seat body for sealing engagement with a valve body, and having an effective sealing diameter and wherein the inner diameter of said annular groove is less than the effective sealing diameter of said body seal with respect to fluid pressure acting radially inwardly.

13. A seat according to claim 12 wherein said body seal comprises an elastomeric seal carried on said seat body.

14. A seat according to claim 1 wherein said seat body comprises a sleeve-like portion for mounting in a valve body and a flange extending radially outwardly from one end of said sleeve-like portion, said contact fact being defined by said one end of said sleeve-like portion and the adjacent side of said flange.

15. A seat according to claim 14 wherein said contact face, exclusively of said annular groove and said vent means, is substantially planar.

16. A seat according to claim 1 wherein said vent means is defined by a plurality of vent grooves formed in said contact face.

17. A seat according to claim 16 wherein said base portion of said seal body is thicker in radial extent than said sealing portion, said sealing portion being disposed partially in said annular groove and spaced radially inwardly from the outer side wall of said annular groove whereby a space is formed within said annular groove between said outer side wall and said sealing portion, and wherein said vent grooves intersect said space.

18. A seat according to claim 17 wherein said vent grooves are generally parallel to one another, and include at least some vent grooves oriented radially with respect to said annular groove, and other vent grooves oriented tangentially to said annular groove.

19. A seat according to claim 5 wherein said lip is disposed adjacent the juncture of said base portion and said sealing portion and cooperates with said sealing portion and said outer side wall to define said space.

20. A seat according to claim 2 wherein said base portion engages said inner and outer side walls to form an interference type seal thereagainst.

* * * * *

UNITED STATES PATENT AND TRADEMARK OFFICE
CERTIFICATE OF CORRECTION

PATENT NO. : 4,625,942

DATED : December 2, 1986

INVENTOR(S) : Norman A. Nelson

It is certified that error appears in the above-identified patent and that said Letters Patent are hereby corrected as shown below:

In Column 11, line 40, after "said" and before "portion" insert --base--.

In Column 12, line 22, after "diameter" insert --,--.

Signed and Sealed this

Fourteenth Day of April, 1987

Attest:

DONALD J. QUIGG

Attesting Officer

Commissioner of Patents and Trademarks